United States Patent [19]

Andersson et al.

[11] Patent Number: 6,061,341
[45] Date of Patent: May 9, 2000

[54] USE OF TRANSMISSION CONTROL PROTOCOL PROXY WITHIN PACKET DATA SERVICE TRANSMISSIONS IN A MOBILE NETWORK

[75] Inventors: Dick Sven Andersson, Stockholm; Torgny Karlsson, Bromma; Anders Herlitz, Nacka, all of Sweden

[73] Assignee: Telefonaktiebolaget LM Ericsson (publ), Stockholm, Sweden

[21] Appl. No.: 08/991,662

[22] Filed: Dec. 16, 1997

[51] Int. Cl.$^7$ .................................................. H04Q 7/24
[52] U.S. Cl. .................................... 370/338; 370/328
[58] Field of Search .................................. 370/328, 338, 370/401, 310, 503, 912, 913, 216, 217, 218

[56] References Cited

U.S. PATENT DOCUMENTS

| | | | |
|---|---|---|---|
| 5,430,709 | 7/1995 | Galloway | 370/241 |
| 5,548,586 | 8/1996 | Kito | 455/433 |
| 5,570,373 | 10/1996 | Wing | 370/241 |
| 5,623,601 | 4/1997 | Vu | 395/187.01 |
| 5,711,006 | 1/1998 | Brochu | 455/422 |
| 5,796,790 | 8/1998 | Brunner | 455/406 |
| 5,802,106 | 9/1998 | Packer | 370/229 |

FOREIGN PATENT DOCUMENTS

PCT/SE98/ 02257  4/1999  WIPO .

OTHER PUBLICATIONS

R.Yavatkarand N.Bhagawat, "Improving End–to–End Performance of TCP over Mobile Internetworks," Proceedings of the Workshop on Mobile Computing Systems and Applications, Dec. 8–9, 1994, pp. 146–152, XP002062284, Santa Cruz, CA, USA.

B. Guha et al., "Network Security Via Reverse Engineering of TCP Code: Vulnerability Analysis and Proposed Solutions," Proceedings of IEEE Infocom 1996. Conference on Computer Communications, Fifteenth Annual Joint Conference of the IEEE Computer and Communications Societies. Networking the Next Generation, San Francisco, Mar. 24–28,, 1996, vol. 2, No. CONF. 15, Mar. 24, 1996, pp. 603–610, XP000621325, IEEE.

A. Bakre et al., "I–TCP: Indirect TCP for Mobile Hosts," Proceedings of the International Conference on Distributed Computing Systems, Vancouver, May 30–Jun. 2, 1995, No. CONF. 15, May 30, 1995, pp. 136–143, XP000530804, IEEE.

J. S. Hansen et al., "Semi–connected TCP/IP in a Mobile Computing Environment," Proceedings of IMC '96 Information Visualization and Mobile Computing, vol. 2, No. 1, Feb. 26–27, 1996, p. 5p, XP002062285, Rostock, Germany.

*Primary Examiner*—Ajit Patel
*Assistant Examiner*—Ricardo M. Pizarro
*Attorney, Agent, or Firm*—Jenkens & Gilchrist, P.C.

[57] ABSTRACT

A method and apparatus for generating a TCP packet connection between a remote host on a first network and a mobile station on a mobile network is disclosed. The process initially involves performing a three-way handshake routine between the remote host and a gateway packet mobile switching center of the mobile network to establish the validity of a TCP packet connection request. During the handshake routine transmissions from the remote host are buffered by the gateway packet mobile switching center. A second three-way handshake routine is then carried out between the gateway packet mobile switching center and the mobile station using the buffered transmissions to complete a TCP connection between the mobile station and the remote host.

18 Claims, 2 Drawing Sheets

USE OF TRANSMISSION CONTROL PROTOCOL PROXY WITHIN PACKET DATA SERVICE TRANSMISSIONS IN A MOBILE NETWORK

BACKGROUND OF THE INVENTION

1. Technical Field of the Invention

The present invention is related to packet data communications, and more particularly, to communications between a remote network host and a mobile station operating within a mobile network interconnected with the remote network.

2. Description of Related Art

Developments and improvements in mobile telecommunication networks have enabled mobile subscribers to communicate data, other than mere voice data, over a serving mobile telecommunications network. With a wide proliferation of Internet and e-mail applications, mobile subscribers are able to access their e-mail messages or even browse or surf the Internet via their associated mobile stations. Accordingly, a mobile station may function as or in association with data terminal equipment (DTE) in providing Internet access or packet communications to an associated mobile subscriber. Voice communications over the mobile network normally use the circuit switch mode of operation. Packet data communications over the mobile network use packet-switched communications, (e.g., TCP/IP), on a packet channel.

A mobile station configured for packet data communications includes a Internet protocol (IP) address which is known by the mobile network. The data terminal equipment attached to the mobile station is configured with this address. An incoming TCP/IP packet addressed to the DTE associated with the mobile station from an exterior network, such as the Internet, forces the mobile network associated with the mobile station to perform a paging of the mobile station. The paging demands that the mobile station switch to a packet mode of operation and establish a packet channel with the mobile network. Once a packet channel is established on the mobile network, the DTE at the mobile station and the Internet host originating the TCP/IP packet can transparently transfer data between each other.

The interconnection between the Internet host and a mobile station utilizes a TCP/IP protocol using a "three-way handshake" routine as illustrated in FIG. 1. In this case, the client comprises the contacting Internet host and the server comprises a mobile station. The three-way handshake routine uses the SYN and ACK flags within the TCP header. An incoming TCP packet from the client (Internet host) includes a set SYN flag bit. The outgoing TCP packet response has both the SYN and ACK flag set. The client responds to this by transmitting a packet response having a set ACK flag. Once this routine has been performed a TCP/IP connection is established between the client and server.

One well known denial of service attack utilized on the Internet today is the TCP SYN flooding attack. In this attack, a client transmits TCP packets having the SYN flag set to a server but does not answer the responding TCP packets having the SYN and ACK flags set. This causes the server to wait for TCP packets including a set ACK flag until the server times out. This has the effect of hanging up system resources until the server timeout period expires.

In the context of a mobile network, when an attacker transmits a TCP SYN packet to a specific address within the mobile network, the mobile network will perform a paging of the associated mobile station provided that the mobile station resides in an idle mode. If the mobile station is capable, a packet data channel is established for the mobile station. If the attack is directed to an entire address base, the network would page all idle mobile stations for that address base. This would eventually download the entire mobile network. This comprises a huge threat for the network and the radio resources associated with the network if a TCP SYN flooding attack is being utilized.

SUMMARY OF THE INVENTION

The present invention overcomes the foregoing and other problems with a system and method enabling the generation of a TCP packet connection between a remote host on a first network, such as the Internet, and a mobile station having included digital terminal equipment within a mobile network. Initially, a three-way handshake routine is performed between the remote host and a gateway packet mobile switching center (GPMSC) associated with the mobile network. The three-way handshake routine is initiated by a TCP SYN packet transmission from the remote host to the mobile station. Rather than forwarding the TCP SYN packet to the mobile station, a TCP proxy functionality associated with the gateway packet mobile switching center buffers the TCP SYN packet and transmits a TCP SYN+ACK packet response to the remote host. The remote host transmits a TCP ACK packet response to the GPMSC. The TCP ACK response is buffered by the TCP proxy functionality while a packet channel is generated between the GPMSC and the mobile station via a visting packet mobile switching center presently serving the mobile station.

Upon creation of a packet channel to the mobile station, a second three-way handshake routine is initiated between the GPMSC and the mobile station. In this handshake routine, the buffered TCP SYN packet which has been forwarded from the GPMSC to a visiting packet mobile switching center is transmitted from the visting packet mobile switching center to the mobile station and associated digital terminal equipment. A response TCP SYN+ACK packet is transmitted from the mobile station back to the GPMSC. In response, the GPMSC transmits the buffered TCP ACK packet of the original three-way handshake routine to the mobile station to initiate the TCP connection between the mobile station and the remote host.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 2:
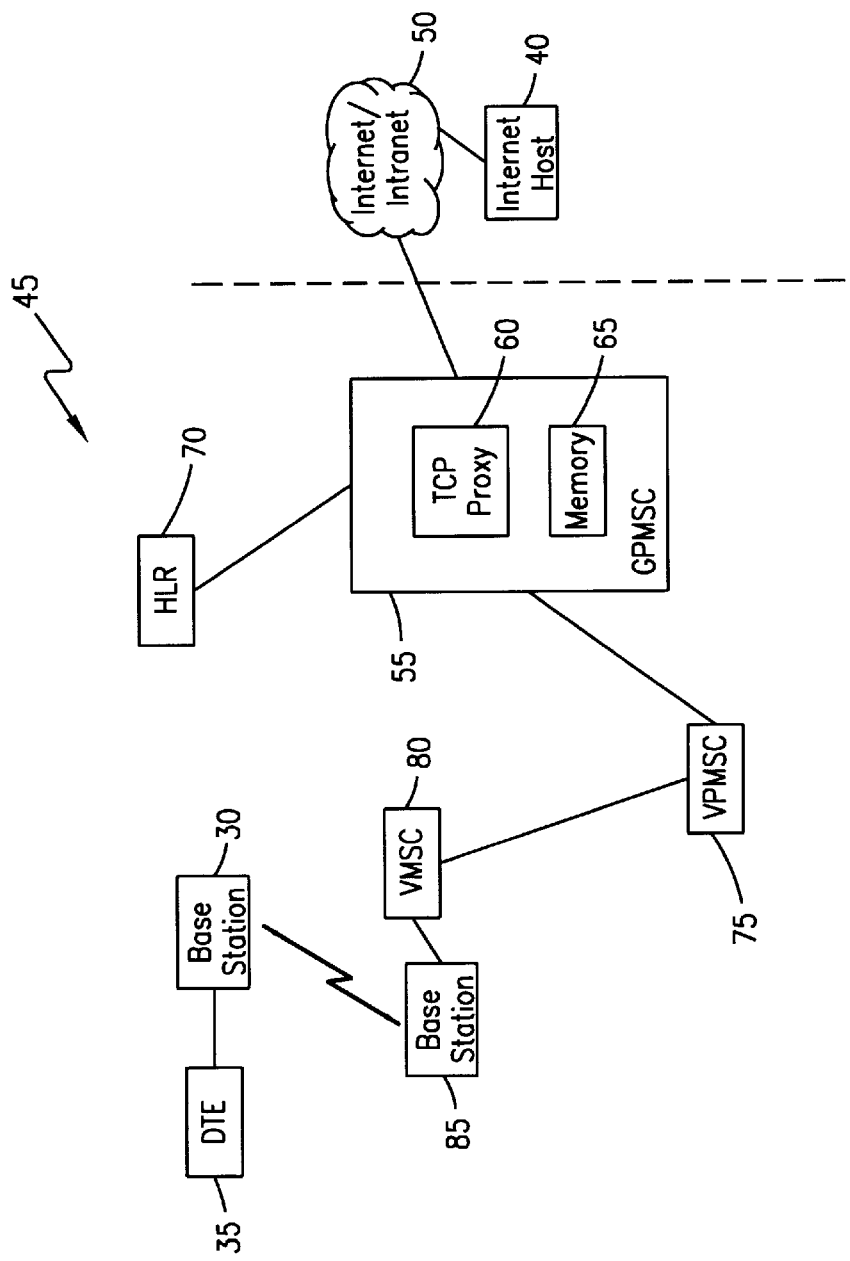
FIG. 2 is a block diagram illustrating the network architecture of a packet mobile network, including a TCP proxy functionality.

Referring now to the Drawings, and more particularly to FIG. 2, there is illustrated the network architecture of a packet mobile network, including a TCP proxy functionality. The goal of the present invention is to enable an interconnection between a mobile station 30 with associated digital terminal equipment (DTE) 35 and a remote host 40 through a mobile network 45 and a remote network 50 (Internet or Intranet). Requests for a TCP connection from a remote host 40 to the mobile station 30 and associated DTE 35 initially pass through the Internet/Intranet network 50 to the mobile network 45 where the connection request is initially received by a gateway packet mobile switching center 55 including a TCP proxy functionality 60. In response to the TCP connection request, a three-way handshake routine, which will be more fully discussed in a moment, is carried out between the GPMSC 55 and the remote host 40. A TCP SYN packet and a TCP ACK packet from the remote host 40 are buffered within a memory 65 associated with the TCP proxy functionality 60 as a result of the three-way handshake routine.

The GPMSC 55 queries a home location register (HLR) 70 associated with the mobile station 30 to determine routing and location information for the mobile station. Using this information, an incoming packet request is transmitted to the visiting packet mobile switching center (VPMSC) 75 serving the mobile station 30. The incoming packet request includes the buffered TCP SYN packet. The VPMSC 75 issues a paging request to the visiting mobile switching center (VMSC) 80 that is providing radio support to the mobile station 30, and the VMSC performs a paging of the mobile station through an associated base station transmitter 85.

If the mobile station 30 responds to the page, a packet data channel is established between the mobile station and the VPMSC 75. The VPMSC 75 initiates a second three-way handshake routine between the VPMSC, mobile station 30 and GPMSC 55 using the buffered TCP SYN packet. This handshake routine results in the stored TCP ACK packet response stored within the memory 65 of the GPMSC 55 being transmitted to the mobile station 30. Upon receipt of the TCP ACK packet response at the mobile station 30, a TCP connection is completed from the mobile station to the GPMSC 55 and the remote host 40. In this manner, TCP packet communications may be carried out from the remote host 40 to the mobile station 30 and associated DTE 35 via the Internet/Intranet network 50 and mobile network 45.

Figure 1:
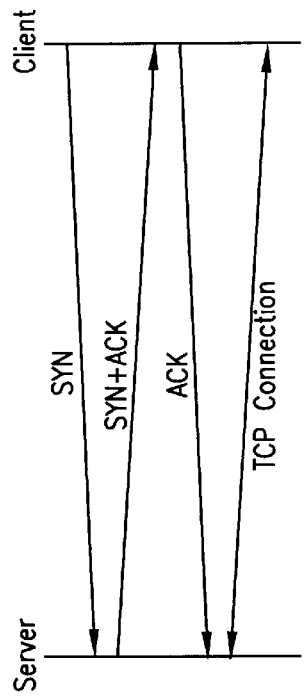
FIG. 1 is an illustration of a three-way handshake routine for establishing a TCP connection.
Figure 3:
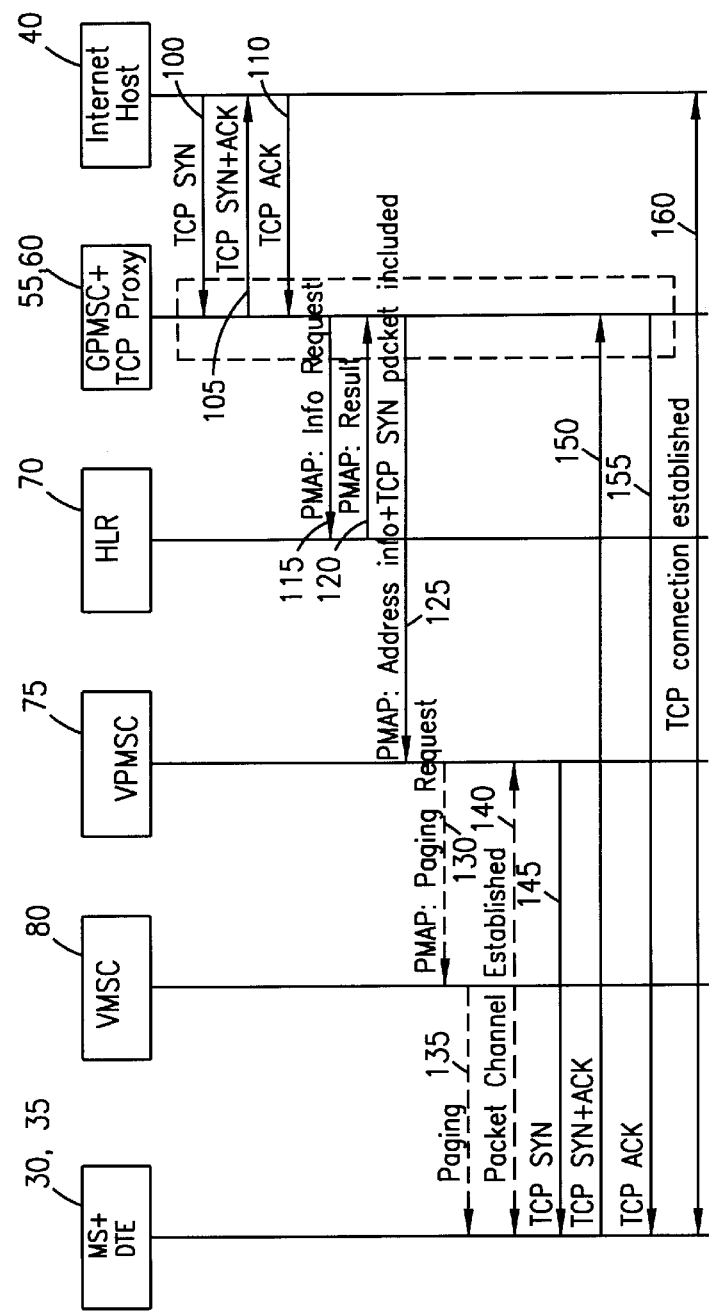
FIG. 3 is a signal diagram illustrating the establishment of a TCP connection between an Internet host and a mobile station with associated digital terminal equipment.

Referring now to FIG. 3, there is illustrated a signaling diagram describing the establishment of a TCP connection 160 between the remote host 40 and the mobile station 30 with associated digital terminal equipment 35. The process is initiated by a TCP SYN packet 100 transmitted from the Internet host 40. The TCP SYN packet 100 is sent to the IP address of the mobile station 30 and associated DTE 35. When the TCP SYN packet 100 is received by the GPMSC 55, the TCP proxy functionality 60 within the GPMSC 55 intercepts, buffers and responds to the TCP SYN packet 100 with a TCP SYN+ACK packet 105 which is transmitted to the Internet host 40. By transmitting the TCP SYN+ACK packet 105, the TCP proxy functionality 60 is acting as the mobile station 30. In response to the TCP SYN+ACK packet 105, the Internet host 40 replies with a TCP ACK packet 110. The GPMSC 55 buffers the TCP ACK packet 110 with the TCP SYN packet 100 and any following TCP packets, if any, (not shown) from the Internet host 40. If for some reason the TCP ACK packet 110 is not received, no further actions are taken by the GPMSC 55.

If a TCP ACK packet 110 is received, the GPMSC 55 performs an IP address to mobile station network address conversion and generates a PMAP protocol information request 115 to the HLR 70 of the mobile station 30 requesting the VPMSC 75 serving the mobile station and the mobile station identifier (MSI) of the mobile station. The home location register 70 responds with a PMAP protocol message 120 providing the VPMSC 75 and MSI of the mobile station 30 to the GPMSC 55. Using this information, the GPMSC 55 generates another PMAP protocol message 125 to the indicated VPMSC 75. The PMAP protocol message 125 includes the encapsulated, buffered TCP SYN packet and address information to the identified VPMSC 75.

The VPMSC 75 determines whether the subscriber is not registered (i.e., not in packet mode), and if not, issues a PMAP protocol paging request 130 to the VMSC 80 serving the mobile station 30. The VMSC 80 generates a paging message 135 to the mobile station 30 requesting that the mobile station switch over to a packet mode of operation. In response to the paging message 135, the mobile station 30 establishes a packet channel 140 with the VPMSC 75. The packet channel establishment procedure includes both registration and authentication of the mobile station 30 with the VPMSC 75.

Once the mobile station establishes a packet channel 140 with the VPMSC 75, the VPMSC transmits the received, buffered TCP SYN packet 145 originally provided by the GPMSC 55 to the mobile station 30. The mobile station 30 responds to the TCP SYN packet 145 with a TCP SYN+ACK packet 150 which is captured by the TCP proxy functionality 60 of the GPMSC 55. In response to the TCP SYN+ACK packet 150, the GPMSC 55 transmits the buffered TCP ACK packet 155 to the mobile station 30 along with any following packets, if any, buffered by the GPMSC. The GPMSC 55 is now transparent to data traffic between the Internet host 40 and mobile station 35, and the TCP connection 160 is established.

In this manner, the mobile network 45 is protected from TCP SYN flooding attacks. The mobile network 45 will not setup a packet data channel with an idle mobile station 30 unless the originating remote host 40 is verified by the TCP proxy functionality 60 according to the three-way handshake procedure. TCP SYN flooding attacks will be stopped at the GPMSC 55 and not disable system resources within the mobile network 45.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for generating a packet connection between a remote host on a first network and a mobile station on a mobile network, comprising the steps of:

receiving a packet connection request from the remote host to the mobile station at a gateway packet mobile switching center;

performing a first three-way handshake routine between the remote host and the gateway packet mobile switching center of the mobile network in response to the packet connection request from the remote host to the mobile station, said step of performing further comprising the steps of;

transmitting an initiation packet from the remote host to the gateway packet mobile switching center to initiate a packet connection;

transmitting a response packet from the gateway packet mobile switching center to the remote host in response to the initiation packet; and transmitting the acknowledge response from the remote host to the gateway packet mobile switching center in response to the response packet;

buffering transmissions of the first three-way handshake routine from the remote host at the gateway packet mobile switching center of the mobile network;

performing a second three-way handshake routine between the gateway packet mobile switching center and the mobile station, wherein transmissions from the gateway packet mobile during the second three-way handshake routine comprise the buffered transmissions from the first three-way handshake routine; and establishing the packet connection between the remote host and the mobile station upon completion of the second three-way handshake routine.

2. The method of claim 1, further comprising the step of:

establishing a packet channel between the gateway packet mobile switching center and the mobile station.

3. The method of claim 2, wherein the step of establishing further includes the steps of:

determining a location of the mobile station by accessing a home location register of the mobile station; and generating a paging request to the mobile station.

4. The method of claim 3, wherein the step of generating further includes the steps of:

generating a paging request to a mobile switching center presently serving the mobile station from a packet mobile switching center serving the mobile station; and paging the mobile station from the serving mobile switching center.

5. The method of claim 1, wherein the step of buffering further includes the steps of:

buffering the initiation packet from the remote host; and buffering the acknowledge response from the remote host.

6. The method of claim 5, wherein the step of performing the second three-way handshake further comprises the steps of:

forwarding the buffered initiation packet from the gateway packet mobile switching center to a visiting packet mobile switching center;

transmitting the buffered initiation packet from the visiting packet mobile switching center to the mobile station upon establishment of a packet channel;

transmitting the response packet from the mobile station to the gateway packet mobile switching center in response to the initiation packet; and transmitting the buffered acknowledge response from the gateway packet mobile switching center to the mobile station in response to the response packet.

7. The method of claim 1, wherein the step of buffering further comprises buffering all packets following the acknowledge response.

8. A method for generating a TCP packet connection between a remote host on an Internet network and a mobile station on a mobile network, comprising the steps of:

performing a first three-way handshake routine between the remote host and a gateway packet mobile switching center of the mobile network in response to a packet connection request from the remote host to the mobile station;

buffering a TCP SYN packet and TCP ACK packet of the first three-way handshake routine and any following TCP packets from the remote host to the gateway packet mobile switching center of the mobile network;

establishing a packet channel between the gateway packet mobile switching center and the mobile station;

transmitting the buffered TCP SYN packet of the first three-way handshake routine from a visiting packet mobile switching center to the mobile station upon establishment of the packet channel;

transmitting a TCP SYN+ACK packet from the mobile station to the gateway packet mobile switching center in response to the TCP SYN packet; and transmitting the buffered TCP ACK packet of the first three-way handshake routine from the gateway mobile switching center to the mobile station in response to the TCP SYN+ACK packet.

9. The method of claim 8, wherein the step of establishing further includes the steps of:

determining a location of the mobile station by accessing a home location register of the mobile station; and generating a paging request to the mobile station.

10. The method of claim 9, wherein the step of generating further includes the steps of:

generating a paging request to a mobile switching center presently serving the mobile station from a visiting packet mobile switching center serving the mobile station; and paging the mobile station from the serving mobile switching center.

11. The method of claim 8, wherein the step of performing the first three-way handshake routine further comprises the steps of:

transmitting the TCP SYN packet from the remote host to the gateway packet mobile switching center to initiate a packet connection;

transmitting the TCP SYN+ACK packet from the gateway packet mobile switching center to the remote host in response to the TCP SYN packet; and transmitting the TCP ACK packet from the remote host to the gateway packet mobile switching center in response to the TCP SYN+ACK packet.

12. The method of claim 8 further including the step of:

forwarding the buffered TCP SYN packet of the first three-way handshake routine from the gateway packet mobile switching center to the visiting packet mobile switching center within a PMAP protocol message.

13. A gateway packet mobile switching center, comprising:

a first interconnection with a first network;

a second interconnection with a mobile network;

a memory for storing transmissions from the remote host on the first network; and a TCP proxy functionality, responsive to a connection request from a remote host in the first network to a mobile station the mobile network for responding to a three-way handshake routine between the gateway packet mobile switching center and the remote host, for storing transmissions from the remote host during the first three-way handshake routine in the memory and for initiating a second three-way handshake routine using the transmissions stored in the memory to complete a packet channel from the remote host to the mobile station.

14. The gateway packet mobile switching center of claim 13, wherein the first network comprises an Internet.

15. The gateway packet mobile switching center of claim 13, wherein the first network comprises an Intranet.

16. The gateway packet mobile switching center of claim 13, wherein the transmissions comprise a TCP SYN packet and a TCP ACK packet.

17. The gateway packet mobile switching center of claim 16, wherein the transmissions further comprises a plurality of stored data packets.

18. A method for generating a TCP packet connection between a remote host on an Internet network and a mobile station on a mobile network, comprising the steps of:

performing a first three-way handshake routine between the remote host and a gateway packet mobile switching center of the mobile network in response to a packet connection request from the remote host to the mobile station;

buffering a TCP SYN packet and TCP ACK packet of received at the gateway packet mobile switching center during the first three-way handshake routine and any following TCP packets from the remote host to the gateway packet mobile switching center of the mobile network;

buffering all packets following the TCP SYN packet and the TCP ACK packet;

establishing a packet channel between the gateway packet mobile switching center and the mobile station;

transmitting the buffered TCP SYN packet from a visiting packet mobile switching center to the mobile station upon establishment of the packet channel;

transmitting a TCP SYN+ACK packet from the mobile station to the gateway packet mobile switching center in response to the TCP SYN packet; and transmitting the buffered TCP ACK of the first three-way handshake routine packet from the gateway mobile switching center to the mobile station in response to the TCP SYN+ACK packet.

* * * * *